(12) United States Patent
Kanai

(10) Patent No.: US 11,826,848 B2
(45) Date of Patent: Nov. 28, 2023

(54) RESISTANCE WELDING CONTROL SYSTEM, CONTROL DEVICE FOR RESISTANCE WELDING CONTROL SYSTEM, AND METHOD OF CONTROLLING RESISTANCE WELDING CONTROL SYSTEM

(71) Applicant: SUBARU CORPORATION, Tokyo (JP)

(72) Inventor: Kenichi Kanai, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 250 days.

(21) Appl. No.: 16/778,253

(22) Filed: Jan. 31, 2020

(65) Prior Publication Data

US 2020/0290146 A1 Sep. 17, 2020

(30) Foreign Application Priority Data

Mar. 14, 2019 (JP) .................................. 2019-046769

(51) Int. Cl.
*B23K 11/25* (2006.01)
*B23K 11/00* (2006.01)
(Continued)

(52) U.S. Cl.
CPC ........ *B23K 11/253* (2013.01); *B23K 11/0026* (2013.01); *B23K 11/20* (2013.01); *B23K 2101/006* (2018.08); *B23K 2103/20* (2018.08)

(58) Field of Classification Search
CPC ... B23K 11/0026; B23K 11/20; B23K 11/253; B23K 11/311; B23K 2103/20; B23K 2101/006
See application file for complete search history.

(56) References Cited

U.S. PATENT DOCUMENTS 4,441,006 A 4/1984 Machida et al.
6,118,095 A * 9/2000 Nagano ................ B23K 11/253
219/110

(Continued)

FOREIGN PATENT DOCUMENTS

EP 3459672 A1 3/2019
JP S57119422 7/1982
(Continued)

OTHER PUBLICATIONS

Japanese Office Action dated Jun. 28, 2022 in Application No. 2019-046769; 17 pages.

*Primary Examiner* — Justin C Dodson
(74) *Attorney, Agent, or Firm* — TROUTMAN PEPPER HAMILTON SANDERS LLP

(57) ABSTRACT

A resistance welding control system includes a pair of electrodes, a driving mechanism, and a control device. The control device includes a detector, a determining unit, and a stop controller. The detector is configured to detect a position of a first electrode of the pair of electrodes and a distance from the first electrode to a second electrode of the pair of electrodes in the approaching-separating direction while electricity is being passed between the first and second electrodes. The determining unit is configured to make a determination as to whether predetermined variation has occurred in the position or the distance. The predetermined variation indicates that a temperature of the member to be welded is at a feature point temperature. The stop controller is configured to stop the electricity passed between the first and second electrodes on the basis of a result of the determination.

3 Claims, 6 Drawing Sheets

(51) Int. Cl.
*B23K 11/20* (2006.01)
*B23K 103/20* (2006.01)
*B23K 101/00* (2006.01)

(56) References Cited

U.S. PATENT DOCUMENTS

2015/0034609 A1* 2/2015 Zhang .................. B23K 11/115
  219/86.23
2018/0056434 A1* 3/2018 Aoki .................. B23K 11/255

FOREIGN PATENT DOCUMENTS

| JP | H1085948 A | 4/1998 |
| JP | 2003285193 A | 10/2003 |
| JP | 2018-001184 A | 1/2018 |

* cited by examiner

RESISTANCE WELDING CONTROL SYSTEM, CONTROL DEVICE FOR RESISTANCE WELDING CONTROL SYSTEM, AND METHOD OF CONTROLLING RESISTANCE WELDING CONTROL SYSTEM

CROSS-REFERENCE TO RELATED APPLICATIONS

The present application claims priority from Japanese Patent Application No. 2019-046769 filed on Mar. 14, 2019, the entire contents of which are hereby incorporated by reference.

BACKGROUND

The technology relates to a resistance welding control system that welds together members to be welded while applying a welding pressure to the members to be welded by means of electrodes, a control device for the resistance welding control system, and a method of controlling the resistance welding control system.

Resistance welding offers some advantages and, for example, leads to less distortion, better appearance, and less time required for welding. In the automobile industry, resistance welding is widely employed especially for manufacturing vehicle bodies. In such resistance welding, it may be important to manage a welding pressure that is to act between the members to be welded. As already known, resistance welding, which is also called spot welding in general, is achieved as mainly joule heat produced by contact resistance between the members to be welded melts the members to be welded, and this contact resistance varies in accordance with the welding pressure on the members to be welded.

When the members to be welded have molten, contact portions of the respective members to be welded need to be held together by means of a pressure applied by electrodes to allow for valid coupling between metal molecules that are in contact with each other. In one mainstream method in recent years, at least one of opposing electrodes, which are also called guns, is allowed to be driven in an approaching-separating direction, and a pressure is applied to the members to be welded by means of the electrodes. For example, in a case where a motor is used as a driving mechanism for the electrodes, the welding pressure on the members to be welded is controlled to a predetermined pressure by managing torque of the motor. In other words, servo control is performed. Japanese Unexamined Patent Application Publication No. 2018-001184 discloses an existing technique. In this technique, displacement of a welding portion of a member to be welded is measured, for example, with a laser displacement sensor. In a case where the displacement amount, that is, a thermal expansion amount, is less than a threshold, it is determined that the welding portion has not molten sufficiently and there is therefore a possibility of a welding defect.

SUMMARY

An aspect of the technology provides a resistance welding control system that includes a pair of electrodes, a driving mechanism, and a control device. The pair of electrodes oppose each other. At least a first electrode, of the pair of electrodes, is configured to move relative to a second electrode of the pair of electrodes in an approaching-separating direction. The driving mechanism is configured to drive at least the first electrode in the approaching-separating direction. The control device is configured to pass electricity between the first and second electrodes while controlling the driving mechanism to cause a predetermined welding pressure to be applied by the first and second electrodes to a member to be welded. The control device includes a detector, a determining unit, and a stop controller. The detector is configured to detect a position of the first electrode or a distance from the first electrode to the second electrode in the approaching-separating direction while electricity is being passed between the first and second electrodes. The determining unit is configured to make a determination as to whether predetermined variation has occurred in the position of the first electrode detected by the detector or the distance from the first electrode to the second electrode detected by the detector. The predetermined variation indicates that a temperature of the member to be welded is at a feature point temperature. The stop controller is configured to stop the electricity passed between the first and second electrodes on the basis of a result of the determination made by the determining unit.

An aspect of the technology provides a control device for a resistance welding control system. The resistance welding control system includes a pair of electrodes opposing each other. At least a first electrode, of the pair of electrodes, is configured to move relative to a second electrode of the pair of electrodes in an approaching-separating direction. The resistance welding control system is configured to pass electricity between the first and second electrodes while causing a predetermined welding pressure to be applied by the first and second electrodes to a member to be welded. The control device includes circuitry. The circuitry is configured to detect a position of the first electrode or a distance from the first electrode to the second electrode in the approaching-separating direction while the electricity is being passed between the first and second electrodes. The circuitry is configured to make a determination as to whether predetermined variation has occurred in the detected position of the first electrode or the detected distance from the first electrode to the second electrode. The predetermined variation indicates that a temperature of the member to be welded is at a feature point temperature. The circuitry is configured to stop the electricity passed between the first and second electrodes on the basis of a result of the determination.

An aspect of the technology provides a method of controlling a resistance welding control system. The resistance welding control system includes a pair of electrodes opposing each other. At least a first electrode, of the pair of electrodes, is configured to move relative to a second electrode of the pair of electrodes in an approaching-separating direction. The resistance welding control system is configured to pass electricity between the first and second electrodes while causing a predetermined welding pressure to be applied by the first and second electrodes to a member to be welded. The method includes: detecting a position of the first electrode or a distance from the first electrode to the second electrode in the approaching-separating direction while the electricity is being passed between the first and second electrodes; making a determination as to whether predetermined variation has occurred in the detected position of the first electrode or the detected distance from the first electrode to the second electrode, the predetermined variation indicating that a temperature of the member to be welded is at a feature point temperature; and stopping the electricity passed between the first and second electrodes on the basis of a result of the determination.

BRIEF DESCRIPTION OF THE DRAWINGS

The accompanying drawings are included to provide a further understanding of the disclosure, and are incorporated in and constitute a part of this specification. The drawings illustrate implementations and, together with the specification, serve to explain the principles of the disclosure.

DETAILED DESCRIPTION

Figure 1:
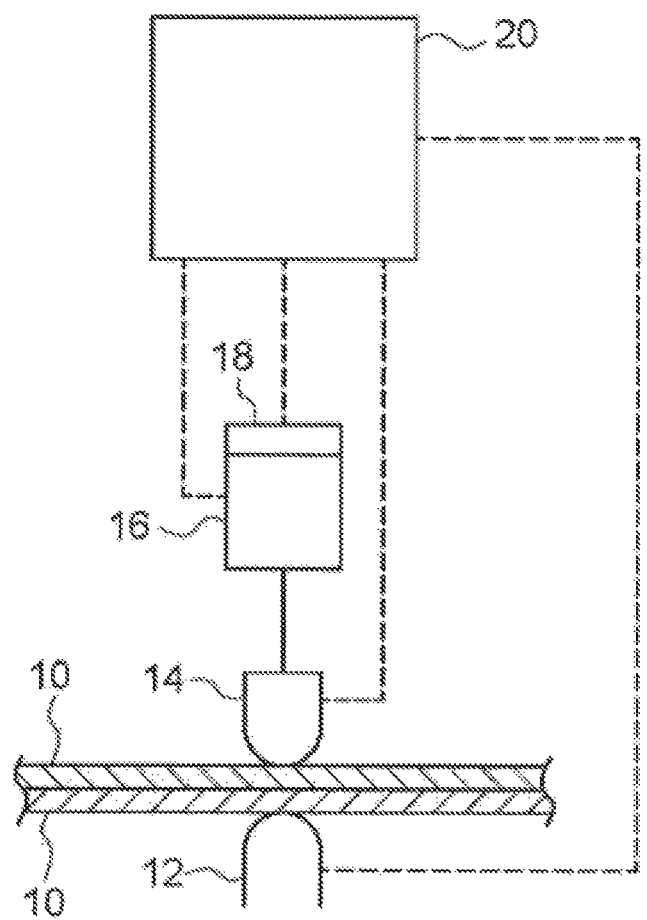
FIG. 1 schematically illustrates an example of a configuration of a resistance welding control system according to an example embodiment of the technology.

Hereinafter, some example embodiments of the technology will be described in detail with reference to the drawings. In the following, some embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

FIG. 1 is a schematic configuration diagram of a resistance welding control system according to an example embodiment of the technology. The resistance welding control system according to the example embodiment may include a pair of electrodes, or guns, 12 and 14. The resistance welding control system may also be referred to below as simply the "system." For example, the resistance welding control system may sandwich and apply a pressure to a pair of thin plate-like members 10 to be welded with the pair of electrodes 12 and 14 in an up-down direction of the drawing. In this state, the resistance welding control system may pass a current between the electrodes 12 and 14. The members 10 to be welded that are sandwiched and have a pressure applied thereto may experience a contact resistance at their respective contact portions, and the joule heat may be produced at the contact portions through the electricity passed between the electrodes 12 and 14. This joule heat may cause the members 10 to be welded to melt and congeal, which may allow welding to be achieved. This portion where melting and congealment have occurred may be called a nugget in general. The number of the members 10 to be welded that is allowed to be used in the resistance welding control system according to the example embodiment is not limited to two, and the shape of each of the members 10 to be welded is not limited to the thin plate-like shape. Further, the members 10 to be welded may include the same material or different materials.

In the example embodiment, of the pair of electrodes 12 and 14 that oppose each other in the up-down direction in FIG. 1, the electrode on the lower side in the drawing may serve as a stationary electrode 12, and the electrode on the upper side in the drawing may serve as a movable electrode 14. The movable electrode 14 may be movable in an approaching-separating direction relative to the stationary electrode 12. The movable electrode 14 may be moved in the approaching-separating direction relative to the stationary electrode 12 by a motor 16. The movable electrode 14 may be brought closer to and moved away from the stationary electrode 12. The stationary electrode 12 and the movable electrode 14 may not only pass a current to the members 10 to be welded sandwiched by the electrodes 12 and 14 but also apply a pressure to the members 10 to be welded at a welding pressure set in advance, as described above. The welding pressure applied to the members 10 to be welded by the electrodes 12 and 14 may generally be maintained constant during the welding is performed while a current is passed. In the example embodiment, so-called servo control may be performed in which driving force of the motor 16 is so controlled as to keep the welding pressure on the members 10 to be welded constant by keeping torque of the motor 16 driving the movable electrode 14 constant. In one embodiment, the motor 16 and a transmission mechanism that transmits the torque of the motor 16 to the movable electrode 14 may serve as a "driving mechanism."

While electricity is being passed between the electrodes 12 and 14, the movable electrode 14 may be displaced by moving away from or approaching the stationary electrode 12 in association with thermal expansion and thermal contraction of the members 10 to be welded, which will be described later. This may occur due to constant-torque control of the motor 16 so performed as to keep the welding pressure on the members 10 to be welded constant. In the example embodiment, an inner state of a welding portion of each of the members 10 to be welded may be estimated with the use of a distance from the electrode 12 to the electrode 14 that oppose each other. The welding portion may be also referred to as a joint. In a specific but non-limiting example, this inner state may be estimated with the use of an electrode displacement, which is an amount of change in the distance between the opposing electrodes 12 and 14. In the example embodiment, since the position of the stationary electrode 12 does not vary, the distance between the electrodes 12 and 14 may be determined if the position of the movable electrode 14 is determined. The position of the movable electrode 14 may be detected by detecting a rotary position of the motor 16 with a preinstalled encoder 18, i.e., a rotary position sensor, that detects a rotor magnetic pole position of the motor 16. Alternatively, it may be also possible to allow both opposing electrodes 12 and 14 to move in the approaching-separating direction and to control the position of each of the electrodes 12 and 14 with a motor. In this case, the distance from the electrode 12 to the electrode 14 opposing each other held while electricity is being passed therebetween may be obtained, for example, from a difference between values detected by the encoders 18 provided on the respective motors.

For example, the driving force of the motor 16 and the current passed between the electrodes 12 and 14 may be controlled by a controller 20. In one embodiment, the controller 20 may serve as a "control device." The controller 20 may include a computer system and have a high computing processing capability. As with an exiting computer system, the computer system included in the controller 20 may include, for example but not limited to, a memory device that holds a program and data and an input/output device for inputting and/or outputting information and data, for example, in addition to a computing processing device having a high computing processing capability. For example, the controller 20 may be able to load a detection signal of the encoder 18 and perform feedback control on a driving current for the motor 16 on the basis of the detection signal of the encoder 18. In one example, a resistance welding control system that performs only resistance welding may have a separate computer system added thereto, and this computer system may serve as the controller 20 and execute a computing process described later.

Figure 2:
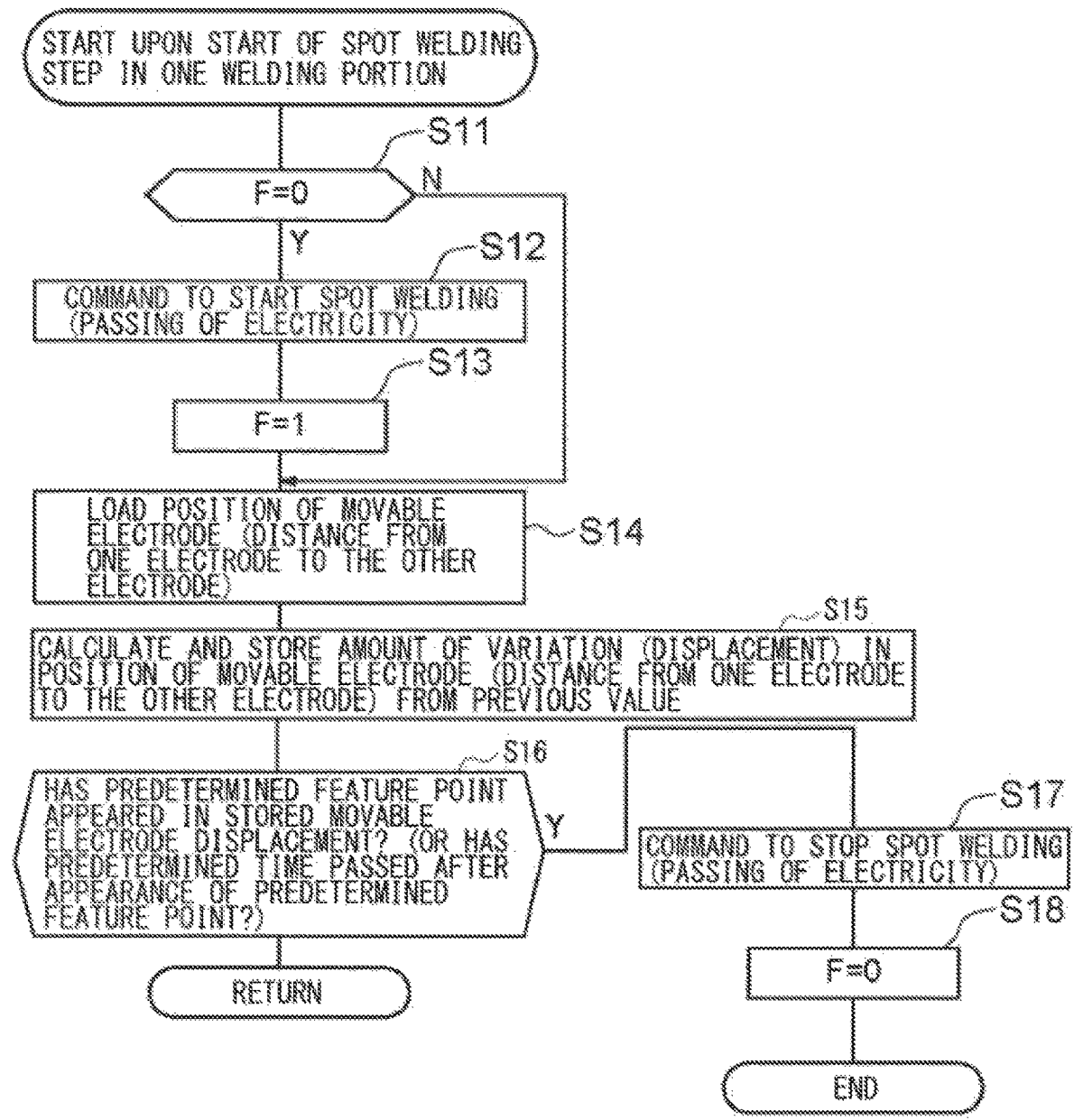
FIG. 2 is a flowchart of an example of a computing process to be executed by a controller of the resistance welding control system according to the example embodiment.

FIG. 2 is a flowchart of a computing process executed in relation to resistance welding in the resistance welding control system according to the example embodiment. This computing process may be executed by the controller 20. The computing process may start upon start of a resistance welding step in one welding portion executed through a separate higher-level computing process. The stated resistance welding step may be spot welding in the example embodiment. After being started, the computing process may be performed by interrupt handling at a predetermined sampling cycle until the end of the computing process. The computing process may manage the start and the end of control on passing of electricity between the electrodes 12 and 14. The control on the passing of electricity between the electrodes 12 and 14 and the control on the driving force of the motor 16 may each be executed through a separate computing process.

In step S11, the controller 20 may determine whether a control flag F is 0 (zero), that is, in a reset state. If the control flag F is in the reset state (F=0) (Y in step S11), the process may proceed to step S12. If the control flag F is not in the reset state (N in step S11), the process may proceed to step S14.

In step S12, the controller 20 may output, for a separate computing process directed to controlling electricity passed between the electrodes, a command to start resistance welding. In a specific but non-limiting example, the controller 20 may output a command to start control on the passing of electricity. Thereafter, the process may proceed to step S13.

In step S13, the controller 20 may set the control flag F to 1, and the process may proceed to step S14.

In step S14, the controller 20 may load the position of the movable electrode 14. In the example embodiment in which the other electrode 12 is stationary, the controller 20 may load the distance from the electrode 12 to the electrode 14. The position of the movable electrode 14 may be calculated through a computation executed as a separate routine on the basis of a detection signal of the encoder 18.

In step S15, the controller 20 may calculate, as a movable electrode displacement, an amount of variation from a previous value to a value of the position of the movable electrode 14 loaded in step S14, i.e., the distance from the electrode 12 to the electrode 14, and store the variation in the movable electrode displacement with respect to the time into a memory device of the computer system. In one embodiment, the movable electrode displacement may serve as an "electrode displacement." In this manner, in the example embodiment, the amount of variation in the position of the electrode or in the distance from the electrode 12 to the electrode 14 per predetermined time may serve as the electrode displacement, and the variation over time in the electrode displacement may be monitored with the computer system in the controller 20.

In step S16, the controller 20 may determine whether a predetermined feature, i.e., a feature point, set in advance has appeared in the movable electrode displacement calculated and stored in step S15. In a case where such a feature has appeared in the movable electrode displacement (Y in step S16), the process may proceed to step S17. In a case where no such feature appears in the movable electrode displacement (N in step S16), the process may return, and the controller 20 may iteratively load the position of the movable electrode 14 (step S14), calculate the movable electrode displacement (step S15), and determine whether the feature has appeared (step S16) until the predetermined feature appears. The predetermined feature, i.e., the feature point, in the electrode displacement will be described later in detail. In step S16, in place of the above, the controller 20 may determine whether a predetermined time has passed after the predetermined feature, i.e., the feature point has appeared. In a case where the predetermined time has passed (Y in step S16), the process may proceed to step S17. If that is not the case, that is, in a case where no feature has appeared yet or the predetermined time has not passed yet after the feature has appeared (N in step S16), the process may return. The predetermined time will also be described later.

In step S17, the controller 20 may output, for a separate computing process directed to controlling electricity passed between the electrodes, a command to stop the resistance welding. In a specific but non-limiting example, the controller 20 may output a command to stop the control on the passing of electricity. Thereafter, the process may proceed to step S18.

In step S18, the controller 20 may reset the control flag F to 0 (zero) and terminate the process.

According to the computing process described above, after the control on the electricity passed between the electrodes is started, the amount of variation in the position of the movable electrode per predetermined time may be calculated and stored as the electrode displacement. In the example embodiment, the amount of variation in the position of the movable electrode per predetermined computing cycle may be calculated and stored. In a case where the predetermined feature set in advance has appeared in the electrode displacement or the predetermined time has passed after the appearance of the feature, the control on the electricity passed between the electrodes may be stopped. Therefore, if the predetermined feature is a feature that appears in the electrode displacement in a case where the temperature of the member 10 to be welded is at its melting point, after that point in time, the member 10 to be welded may be allowed to melt reliably at the welding portion, and the molten material may be allowed to congeal. Accordingly, it is possible to ensure the quality of the welding portion of the member 10 to be welded or at least to improve the quality of the welding portion.

Figure 3:
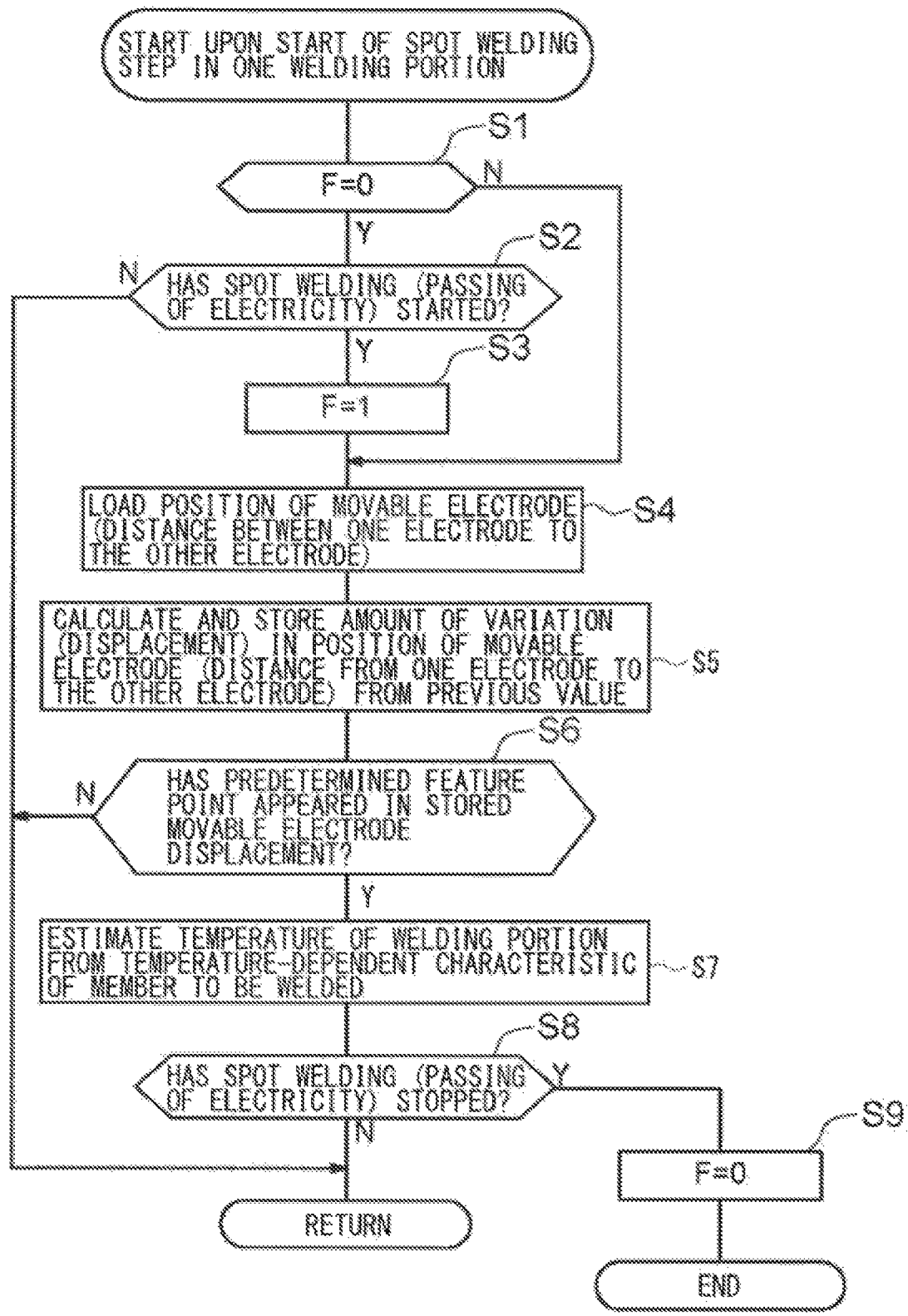
FIG. 3 is a flowchart of another example of the computing process to be executed by the controller of the resistance welding control system according to the example embodiment.

FIG. 3 is a flowchart of a computing process to be executed in relation to resistance welding in a resistance welding control system according to a modification example of the example embodiment. In the modification example, the controller 20 may serve as a unit directed to estimating a temperature of a member to be welded. As with the computing process illustrated in FIG. 2, this computing process may be executed by the controller 20. The computing process may start upon the start of a resistance welding step, i.e., spot welding, in one welding portion executed through a separate higher-level computing process. After being started, the computing process may be performed by interrupt handling at a predetermined sampling cycle until the end of the computing process. The computing process may be performed to estimate the temperature of the members 10 to be welded during the control on the electricity passed between the electrodes. The control on the electricity passed between the electrodes 12 and 14 and the control on the driving force of the motor 16 may each be executed through a separate computing process.

In step S1, the controller 20 may determine whether a control flag F is 0 (zero) (F=0), that is, in a reset state. If the control flag F is in the reset state (Y in step S1), the process may proceed to step S2. If the control flag F is not in the reset state (N in step S1), the process may proceed to step S4.

In step S2, the controller 20 may determine whether resistance welding has started on the basis of a response to a separate computing process directed to controlling the electricity passed between the electrodes. In a specific but non-limiting example, the controller 20 may determine whether the control on the passing of electricity has started on the basis of the response to the separate computing process directed to controlling the electricity passed between the electrodes. In a case where the control on the passing of electricity has started (Y in step S2), the process may proceed to step S3. In a case where the control on the passing of electricity has not started (N in step S2), the process may return, and the controller 20 may repeat the determination (step S1) as to whether the control flag F is in the reset state.

In step S3, the controller 20 may set the control flag F to 1, and the process may proceed to step S4.

In step S4, the controller 20 may load the position of the movable electrode 14. In the example embodiment, the controller 20 may load the distance from the electrode 12 to the electrode 14. As in the foregoing example, the position of the movable electrode 14 may be calculated through a computation executed as a separate routine on the basis of a detection signal of the encoder 18.

In step S5, the controller 20 may calculate, as a movable electrode displacement, an amount of variation from a previous value to a value of the position of the movable electrode 14 loaded in step S4, i.e., the distance from the electrode 12 to the electrode 14, and store variation in the movable electrode displacement with respect to the time into the memory device of the computer system. In one embodiment, the movable electrode displacement may serve as an "electrode displacement."

In step S6, the controller 20 may determine whether a predetermined feature, i.e., a feature point, set in advance has appeared in the movable electrode displacement calculated and stored in step S5. In a case where such a feature has appeared in the movable electrode displacement (Y in step S6), the process may proceed to step S7. In a case where no such feature appears in the movable electrode displacement (N in step S6), the process may return. After the process has returned, as in the example described above, the controller 20 may continue to monitor any variation in the movable electrode displacement and repeat the processes in steps S4 to S6. The predetermined feature, i.e., the feature point, in the electrode displacement will be described later in detail.

In step S7, the controller 20 may estimate the temperature of the members 10 to be welded at their welding portions on the basis of a temperature-dependent characteristic of the members 10 to be welded confirmed in advance. In a specific but non-limiting example, the controller 20 may estimate the temperature of the members 10 to be welded at their welding portions on the basis of a temperature-dependent characteristic of a material included in the members 10 to be welded. In the example embodiment, the material included in the members 10 to be welded may be metal. The estimated temperature may be stored sequentially into a storage device or a temperature already stored in the storage device may be updated with the estimated temperature, for example, for the computing process directed to the control on the electricity passed between the electrodes. In a specific but non-limiting example, a memory device of the computer system may hold a correlation between the temperature of the members 10 to be welded and the feature of the electrode displacement that is based on the temperature-dependent characteristic of the material of the members 10 to be welded confirmed in advance. In a case where the predetermined feature has appeared in the movable electrode displacement, the temperature of the members 10 to be welded may be estimated to be a temperature corresponding to the correlation between the electrode displacement feature and the temperature of the members to be welded, i.e., a feature point temperature.

In step S8, the controller 20 may determine whether the resistance welding has stopped on the basis of a response to a separate computing process directed to controlling the electricity passed between the electrodes. In a specific but non-limiting example, the controller 20 may determine whether the control on the passing of electricity has stopped on the basis of the response to the separate computing process directed to controlling the electricity passed between the electrodes. In a case where the control on the passing of electricity has stopped (Y in step S8), the process may proceed to step S9. In a case where the control on the passing of electricity has not stopped yet (N in step S8), the process may return, and the controller 20 may wait for a command to stop the control on the passing of electricity.

In step S9, the controller 20 may reset the control flag F to 0 (zero) and terminate the process.

According to the computing process described above, after the control on the electricity passed between the electrodes is started, the amount of variation in the position of the movable electrode may be calculated and stored as the electrode displacement. In a case where the predetermined feature set in advance has appeared in this electrode displacement, the temperature of the members 10 to be welded may be estimated to be the temperature corresponding to the stored correlation between the electrode displacement feature and the temperature of the members 10 to be welded. Therefore, if the predetermined feature is a feature that appears in the electrode displacement in a case where the temperature of the members 10 to be welded is the melting point, after that point in time, it may be possible to cause the members 10 to be welded to melt at their welding portions and to allow the molten material to congeal. Therefore, stopping the control on the passing of electricity in a case where the predetermined feature has appeared or the predetermined time has passed after the appearance of such a feature makes it possible to ensure the quality of the welding portions of the members 10 to be welded or at least to improve the quality of the welding portions.

Figure 4:
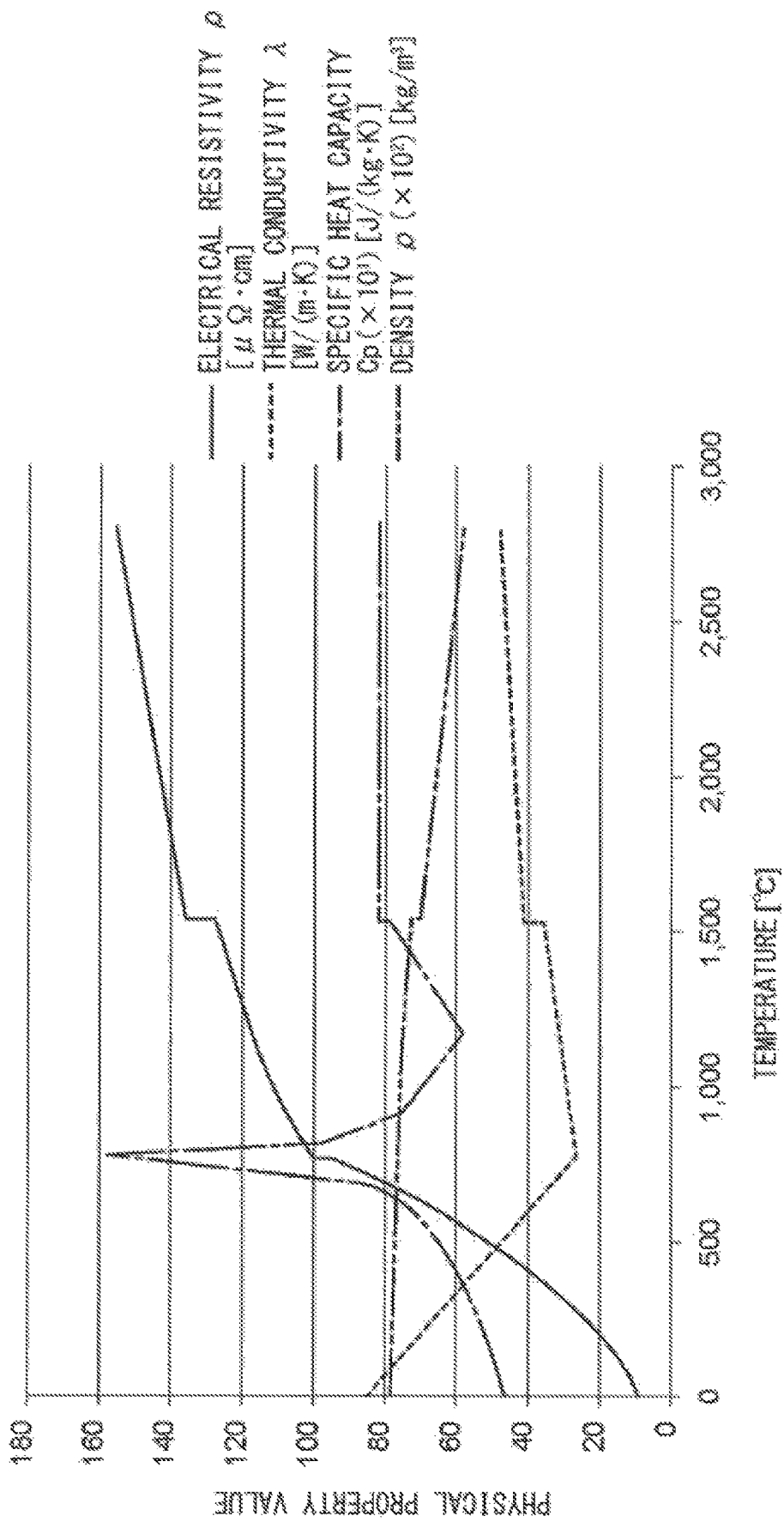
FIG. 4 is an explanatory diagram illustrating an example of temperature characteristics of temperature-dependent physical property values of steel.

Next, a principle of a computing process in relation to the control on the electricity passed between the electrodes will be described with an example case where the two members 10 to be welded each include steel. As already known, steel may have temperature-dependent characteristics, including magnetic transformation, austenitic transformation, and a melting point or melting. Further, steel may have various physical property values that are dependent on the temperature. Table 1 and FIG. 4 illustrate a correlation between the temperature and the temperature dependent physical property values of steel, e.g., electrical resistivity, thermal conductivity, a specific heat capacity, and a density. In FIG. 4, the electrical resistivity is indicated by a solid line, the thermal conductivity is indicated by a dotted line, the specific heat capacity is indicated by a dashed-dotted line, and the density is indicated by a dashed-two-dotted line.

respect to passage of time from a time t0 when the electricity starts being passed. In this example, a current may be passed between the electrodes 12 and 14 until a time t3. As can be appreciated from Part (A) of FIG. 5, the members 10 to be welded may experience thermal expansion caused by joule heat while the electricity is being passed and experience thermal contraction caused by congealment after the passing of electricity has stopped. In this example, when the amount of variation in the position of the movable electrode, i.e., the distance from the electrode 12 to the electrode 14, that is, the electrode displacement is considered, its profile may have several features or feature points. In Part (A) of FIG. 5, the electrode displacement is indicated by a solid line. In the example embodiment, the electrode displacement may be displacement of the movable electrode. The electrode displacement may be regarded as a derivative value, i.e., slope, of variation in the position of the movable electrode. Therefore, a feature point of the electrode displacement may also be regarded as a point of variation in the slope of the variation in the position of the movable electrode.

Figure 5:
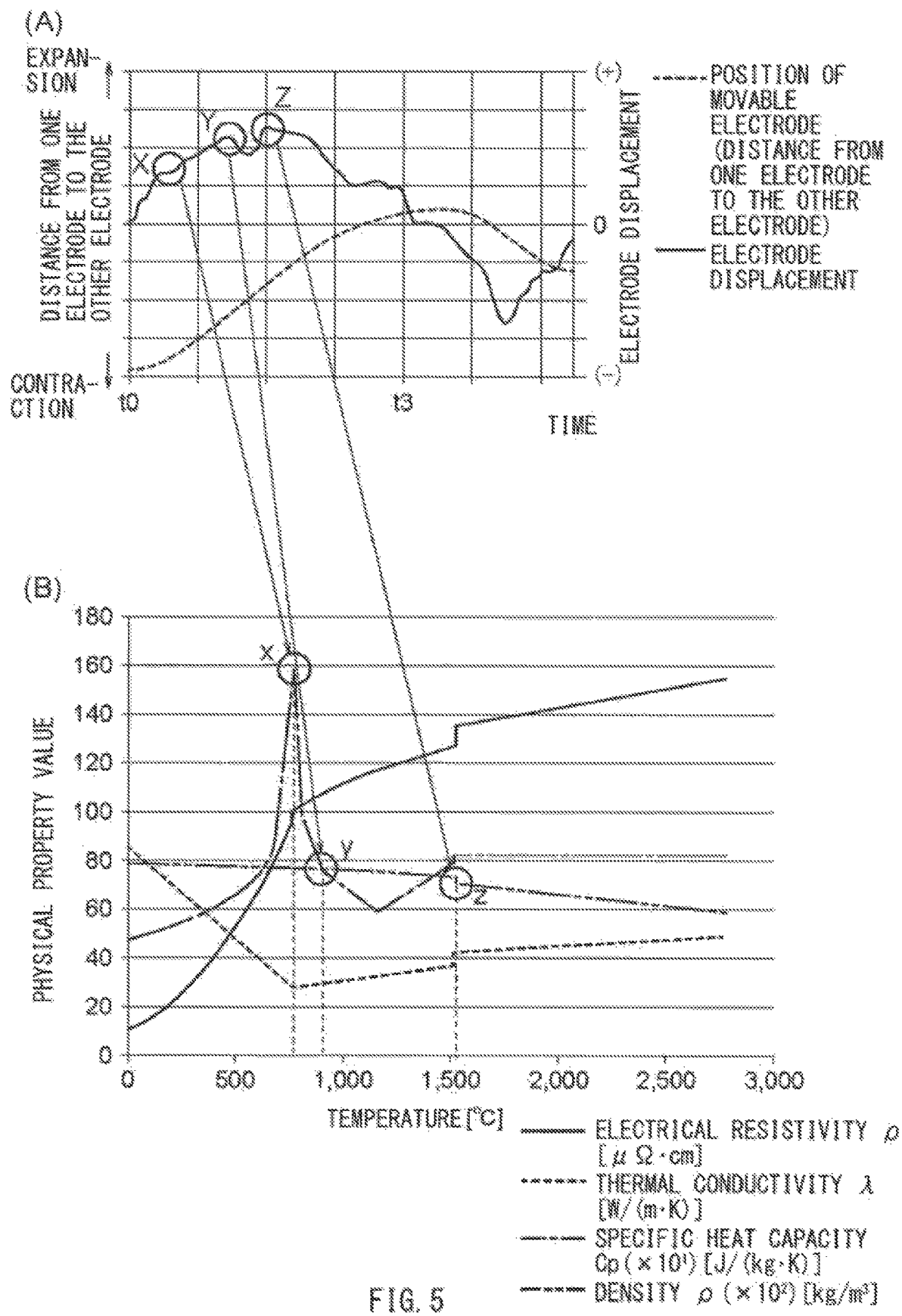
FIG. 5 is an explanatory diagram illustrating an example of a correlation between the temperature-dependent physical property values of steel and an electrode displacement, e.g., a position of an electrode or a distance from one of the electrodes to the other.

In Part (A) of FIG. 5, a feature point X of the electrode displacement that appears first may be considered to be a

TABLE 1

| Temperature [° C.] | Electrical resistivity ρ [μΩ · cm] | [Ω · m] | Thermal conductivity λ [W/(m · K)] | Specific heat capacity Cp [J/(kg · K)] | Density ρ [kg/m³] | |
|---|---|---|---|---|---|---|
| 0 | 10.2 | 1.02E−07 | 65.00 | 475 | 7661 | |
| 100 | 13.7 | 1.37E−07 | 77.50 | 496 | 7847 | |
| 200 | 19.6 | 1.96E−07 | 70.00 | 525 | 7813 | |
| 300 | 27.6 | 2.76E−07 | 62.50 | 557 | 7778 | |
| 400 | 36.0 | 3.6E−07 | 55.00 | 597 | 7744 | |
| 500 | 50.6 | 5.06E−07 | 47.50 | 650 | 7710 | |
| 600 | 65.4 | 6.54E−07 | 40.00 | 727 | 7676 | |
| 700 | 62.5 | 6.25E−07 | 32.50 | 875 | 7642 | |
| 769 | 95.6 | 9.56E−07 | 27.33 | 1583 | 7616 | Magnetic transformation |
| 771 | 100.4 | 1E−06 | 27.71 | 1583 | 7617 | |
| 800 | 102.4 | 1.02E−06 | 28.00 | 1016 | 7607 | |
| 900 | 107.7 | 1.08E−06 | 29.00 | 772 | 7573 | |
| 909 | 108.1 | 1.08E−06 | 29.09 | 760 | 7570 | Austenitic transformation |
| 910 | 108.2 | 1.08E−06 | 29.10 | 759 | 7640 | |
| 1000 | 111.6 | 1.12E−06 | 30.00 | 676 | 7595 | |
| 1100 | 115.3 | 1.15E−06 | 31.00 | 616 | 7545 | |
| 1159 | 117.1 | 1.17E−06 | 31.59 | 589 | 7515 | |
| 1160 | 117.2 | 1.17E−06 | 31.60 | 587 | 7515 | |
| 1200 | 118.4 | 1.18E−06 | 32.00 | 609 | 7495 | |
| 1300 | 121.1 | 1.21E−06 | 33.00 | 665 | 7445 | |
| 1399 | 123.6 | 1.24E−06 | 33.99 | 720 | 7395 | δ iron transformation |
| 1400 | 123.7 | 1.24E−06 | 34.00 | 721 | 7341 | |
| 1500 | 126.0 | 1.26E−06 | 35.00 | 777 | 7311 | |
| 1535 | 126.6 | 1.27E−06 | 35.35 | 797 | 7301 | Melting point |
| 1536 | 136.0 | 1.36E−06 | 40.68 | 824 | 7037 | |
| 1600 | 136.9 | 1.37E−06 | 41.00 | 824 | 6978 | |
| 1700 | 138.5 | 1.38E−06 | 41.50 | 824 | 6885 | |
| 1800 | 140.0 | 1.4E−06 | 42.00 | 824 | 6792 | |
| 1900 | 141.6 | 1.42E−06 | 42.50 | 824 | 6700 | |
| 2000 | 143.1 | 1.43E−06 | 43.00 | 824 | 6607 | |
| 2100 | 144.6 | 1.45E−06 | 43.50 | 824 | 6515 | |
| 2200 | 146.2 | 1.46E−06 | 44.00 | 824 | 6422 | |
| 2300 | 147.7 | 1.48E−06 | 44.50 | 824 | 6329 | |
| 2400 | 149.3 | 1.49E−06 | 45.00 | 824 | 6237 | |
| 2500 | 150.6 | 1.51E−06 | 45.50 | 824 | 6144 | |
| 2600 | 152.3 | 1.52E−06 | 46.00 | 824 | 6052 | |
| 2700 | 153.9 | 1.54E−06 | 46.50 | 824 | 5959 | |
| 2800 | 155.4 | 1.55E−06 | 47.00 | 824 | 5866 | |

The position of the movable electrode obtained from the detection signal of the encoder 18, that is, the distance from the electrode 12 to the electrode 14 may be observed as indicated by the dashed line in Part (A) of FIG. 5 with local maximum point x of the specific heat capacity, that is, a magnetic transformation point, or the Curie point, of steel. At this magnetic transformation point, the specific heat capacity may have risen, and a rising rate of the temperature of the members 10 to be welded may decrease or the temperature of the members 10 to be welded may decrease. Thereby, the slope of the variation in the position of the movable electrode, i.e., the distance from the electrode 12 to the electrode 14, may vary from an increase to a decrease. Accordingly, the first feature point X indicating such a feature may be estimated to indicate the magnetic transformation temperature of steel, which may be about 770° C.

A feature point Y of the electrode displacement that appears second may be considered to be an increase point of the density, that is, the austenitic transformation point. As already known, in the austenitic transformation, a space between atoms may decrease, and the density may thereby increase. Therefore, the volume may decrease, and the electrode displacement may shift from an increase to a decrease. Accordingly, the second feature point Y indicating such a feature may be estimated to indicate the austenitic transformation temperature, which may be about 910° C.

A feature point Z of the electrode displacement that appears third may be considered to be a decrease point of the density, that is, the melting point. As already known, at the melting point, the density may decrease along with a change in the phase from the solid to the liquid. Therefore, the volume may increase, and the electrode displacement may also increase. Yet, after melting, the shape may vary or be compressed as a result of the welding pressure exerted by the electrodes 12 and 14, for example, and the electrode displacement may thereby shift from an increase to a decrease. Accordingly, the third feature point Z indicating such a feature may be estimated to indicate the melting point, which may be about 1356° C.

In this example, in order to verify that the third feature point Z of the electrode displacement described above is the melting point, whether a nugget was formed at a welding portion was determined with the duration for which the electricity was passed between the electrodes 12 and 14 varied. In order to ensure the quality of a welding portion in resistance welding, it may be important that a nugget be formed reliably at the welding portion. In each of FIGS. 6A to 6C, a horizontal axis represents time, and a vertical axis represents the distance from the electrode 12 to the electrode 14, i.e., the position of the movable electrode, and the electrode displacement, which is the amount of variation in the distance from the electrode 12 to the electrode 14. The resistance welding was performed with the passed current and the welding pressure on the members to be welded kept constant, and only the duration for which the electricity was passed was varied. The drawings illustrate that, although only the duration for which the electricity was passed was varied, both the distance between the electrodes and the profile of the electrode displacement varied. This is due to variation in the contact resistance value of each test piece, for example, and the scale on the vertical axis also varies among the tests.

Figure 6A:
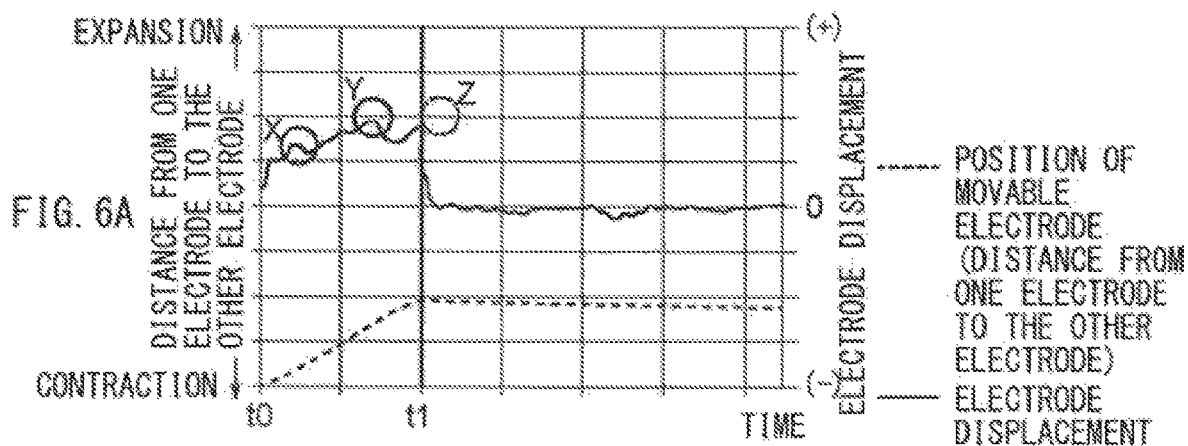
FIGS. 6A to 6C are explanatory diagrams illustrating examples of electrode displacements obtained in respective cases where a duration for which electricity is passed between the electrodes is varied for comparison.

In FIG. 6A, the electricity was passed from a time t0 to a time t1, that is, immediately before the third feature point Z appeared in the electrode displacement. In this test piece, the two members 10 to be welded peeled off of each other, and therefore, no nugget was formed. In other words, in this test piece, the members 10 to be welded did not melt, which indicates that the third feature point Z is the melting point of steel.

Figure 6B:
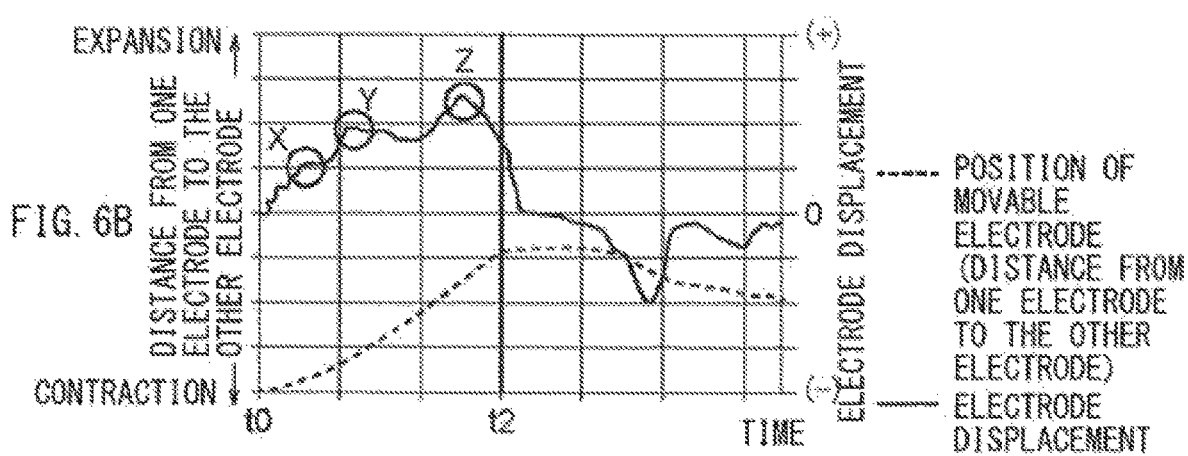

In FIG. 6B, the electricity was passed from the time t0 to a time t2, that is, until a point immediately after the third feature point Z appeared in the electrode displacement. In this test piece, the welding portion after welding was cut to observe the section, and formation of a nugget was confirmed in the section of the welding portion. This verifies that the third feature point Z is the melting point of steel.

Figure 6C:
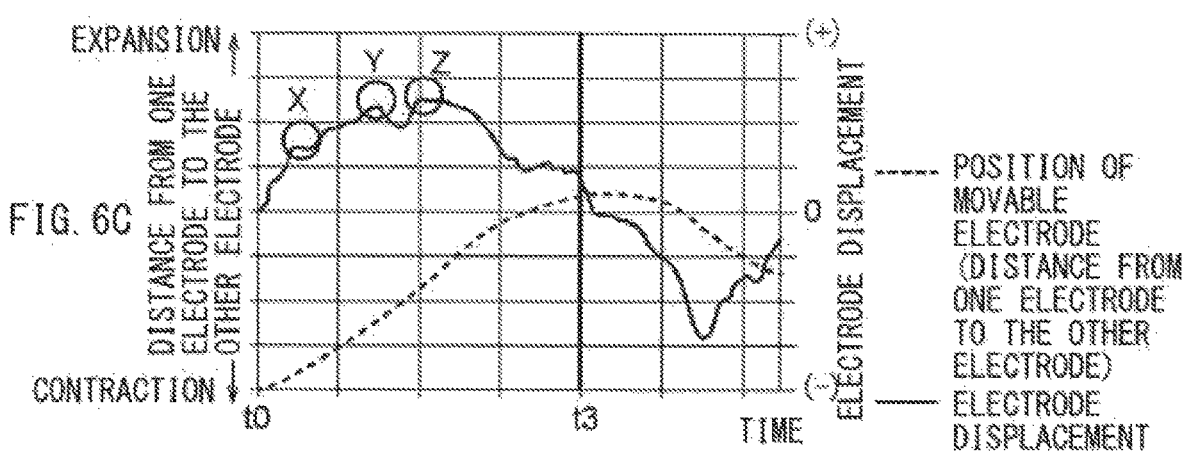

Further, in FIG. 6C, the electricity was passed from the time t0 to a time t3, as in FIG. 5, that is, until the third feature point Z appeared in the electrode displacement and a predetermined time had passed thereafter. In this test piece as well, formation of a nugget was confirmed in a section of a welding portion. This verifies that the third feature point Z is the melting point of steel.

As described above, for example, the predetermined feature point on which the determination is to be made in step S16 of the computing process illustrated in FIG. 2 may be set to the third feature point Z described above. This may allow the electricity to be passed until the third feature point Z, that is, the feature at the melting point, appears in the electrode displacement or until the predetermined time passes after the appearance of such a feature. This makes it possible to form a nugget reliably at the welding portions of the members 10 to be welded and to ensure the quality of the welding portions or at least to improve the quality of the welding portions.

In a similar manner, the predetermined feature point in relation to the determination process in step S6 of the computing process illustrated in FIG. 3 may be set to the third feature point Z described above. This may make it possible to estimate the temperature of the members 10 to be welded held when the feature at the third feature point Z described above appears in the electrode displacement, that is, the melting point. Therefore, passing the electricity until the melting point is estimated or until the predetermined time passes after the melting point has been estimated makes it possible to form a nugget reliably at the welding portions of the members 10 to be welded. This ensures the quality of the welding portions or at least improves the quality of the welding portions. Further, if the predetermined feature point in relation to the determination process in step S6 is set to the first feature point X described above instead of the feature point Z, the temperature at the magnetic transformation point may be estimated. If the predetermined feature point is set to the second feature point Y, the temperature at the austenitic transformation point may be estimated.

Further, for example, it may be possible to set the time from the appearance of the feature point Z indicating the melting point in FIG. 6B, that is, the time t2 to the time t3 in FIG. 6C, as the predetermined time described above. For example, even with the members 10 to be welded including the same steel, in a case where the members 10 to be welded differ in thickness, the thinner member 10 to be welded may not melt, although the thicker member 10 to be welded has started to melt immediately after the feature point Z indicating the melting point has appeared in the electrode displacement. The non-melting of the thinner member 10 to be welded may be also referred to as a melt defect. One reason for this may be that the welding portion starts to melt from a portion at approximately the middle in the distance from the electrode 12 to the electrode 14. Therefore, in such a case, the predetermined time described above may be set in consideration of a margin of time for the entire material of the members 10 to be welded that is to be molten to melt.

In a case where the resistance welding control system according to the example embodiment is used in dissimilar resistance welding of aluminum and steel, the following may be conceivable.

As already known, in the dissimilar resistance welding of aluminum and steel, since an intermetallic compound of aluminum and steel is brittle, it may be desired to suppress or avoid generation of this compound. In a specific but non-limiting example, only aluminum may be molten, and the molten aluminum may be bonded to a steel member. As described above, the melting point of steel may be about 1356° C., and the melting point of aluminum may be about 660° C. Therefore, an aluminum member 10 to be welded and a steel member 10 to be welded may be joined together, and electricity may be passed between the electrodes while applying pressure. If a feature has appeared in the electrode displacement at the magnetic transformation temperature of steel, which is about 770° C., and at the austenitic transformation temperature of steel, which is about 910° C., the aluminum member 10 to be welded may be estimated to be at an equivalent temperature or an approximately-equivalent temperature. In other words, in the dissimilar resistance welding of aluminum and steel, for example, the feature in the electrode displacement at the magnetic transformation temperature of steel or the feature in the electrode displacement at the austenitic transformation temperature of steel may be set to the predetermined feature described above. Further, if these features have appeared in the electrode displacement, the temperature of the aluminum member 10 to be welded may be estimated to be at the melting point or higher, and the aluminum member 10 to be welded may be estimated to have molten. Accordingly, if the passing of electricity is stopped when such a feature has appeared or when the predetermined time has passed after the appearance of such a feature, it becomes possible to achieve dissimilar resistance welding of aluminum and steel while suppressing generation of the intermetallic compound described above.

Aside from the above, excluding metal that is not suitable for resistance welding, such as highly-conductive metal, it is possible to apply the resistance welding control system according to the example embodiment to any metal resistance welding. In other words, temperature-dependent characteristics of various types of metal have already confirmed, and if features in the electrode displacement that are based on these temperature-dependent characteristics become clear, it may be possible to estimate the temperature of the members 10 to be welded when a predetermined feature has appeared in the electrode displacement. In a specific but non-limiting example, it may be possible to estimate the melting point of the members 10 to be welded. Based on this estimation, it is possible to ensure the quality of the welding portions of the members 10 to be welded or at least to improve the quality of the welding portions.

In this manner, in the example embodiment, the correlation between the feature in the electrode displacement based on the temperature-dependent characteristics of the material of the members 10 to be welded and the temperature of the members 10 to be welded may be stored in advance. Further, the feature in the electrode displacement indicating that the temperature of the members 10 to be welded has reached the melting point may be set to the predetermined feature. Thereby, in a case where it is determined that the predetermined feature has appeared in the calculated electrode displacement, the welding portions of the members 10 to be welded may be estimated to have molten, making it possible to set appropriate timing to stop the passing of electricity. It thereby becomes possible to ensure or improve the quality of the welding portions of the members 10 to be welded.

Further, since it is possible to detect the position of an electrode or the distance from one electrode to the other electrode with the use of the encoder 18 provided in advance on the motor 16, such as a servomotor, no new sensor needs to be provided for detecting the electrode displacement, making it possible to suppress an increase in cost, an increase in size of the structure, and an increase in complexity of the structure.

Thus far, the resistance welding control system according to one example embodiment of the technology has been described. The technology, however, is not limited to the specific configuration described above, and various modifications may be made within the scope of the technology. For example, the feature in the electrode displacement at the melting point of the members to be welded may serve as the predetermined feature in the example embodiment described above; however, this is non-limiting. In another example embodiment, it may be possible to set, as the predetermined feature, a feature in the electrode displacement corresponding to various temperature-dependent characteristics of the material of the members to be welded. In this case, it may be possible to estimate that a temperature-dependent characteristic corresponding to the welding portions of the members to be welded has appeared when the set predetermined feature has appeared in the electrode displacement.

The welding pressure on the members to be welded exerted by the opposing pair of electrodes may be constant in the example embodiment described above; however, this is non-limiting. Alternatively, as already known, there exists a resistance welding machine with a variable welding pressure. In this case, the resistance welding control system according to an example embodiment of the technology may be applied to a region where the welding pressure is controlled to be constant.

The amount of variation from a previous value to a value of the position of the movable electrode, or the distance from the electrode 12 to the electrode 14, at each sampling timing may serve as the electrode displacement in the example embodiment described above; however, this is non-limiting. Alternatively, this amount of variation may be a mean value of several previous values including the current value, or a so-called moving average value.

Some example effects obtained from one example embodiment of the technology are summarized below.

For resistance welding, there is a technique for determining a possibility of a welding defect. In a specific but non-limiting example, displacement in a welding portion of a member to be welded may be measured, for example, with a laser displacement sensor. In a case where this displacement amount, that is, the thermal expansion amount in the welding portion is less than a threshold, it may be determined that the welding portion has not molten sufficiently, and therefore, there is a possibility of a welding defect. This technique merely determines whether there is a possibility of an anomaly in the welding portion of the member to be welded. That is, this technique merely retrospectively detects an anomaly that has already occurred on the basis of a determination on its possibility. This technique is not for ensuring or improving the quality of the welding portion by causing the member to be welded to melt and congeal favorably at its welding portion. If an inner state or structure of the welding portion is to be checked in order to grasp the state of the welding portion in resistance welding, or in other words, the state of the resistance welding, it may be only possible to cut the welding portion after being welded for observation. On the other hand, it may be possible to estimate the inner state of the welding portion by detecting or estimating the temperature of the welding portion. However, since the member to be welded is sandwiched by electrodes, it may be difficult to detect the temperature of the welding portion, and even if the temperature is to be estimated, the estimation may lack accuracy. Therefore, in the technical field of resistance welding, it may be desired to allow the quality of the welding portion to be ensured or at least improved by detecting or estimating the inner state of the welding portion of the member to be welded, or especially that the member to be welded has molten. This may be strongly desired in order to achieve mass production in dissimilar resistance welding of aluminum and steel, which is attracting attentions in the automobile industry in recent years.

In the example embodiment, for example, the feature in the electrode displacement corresponding to the temperature-dependent characteristics may be grasped in advance on the basis of the correlation between the electrode displacement and the temperature-dependent characteristics, such as the magnetic transformation, the austenitic transformation, and the melting point or melting, of the material, e.g., metal, of the members to be welded. Further, the feature in the electrode displacement indicating that the members to be welded are at the feature point temperature may be set in advance as the predetermined feature. In this example, the feature point temperature may refer to the temperature of the members to be welded held when characteristic variation occurs in the position of the electrode or the distance from one electrode to the other electrode on the basis of the temperature-dependent characteristics, e.g., phase transformation, such as melting, of the material of the members to be welded. Further, if this predetermined feature has appeared in the electrode displacement calculated as the amount of variation in the position of the electrode or the distance from one electrode to the other electrode, it may be estimated that the temperature-dependent characteristic, e.g., melting, corresponding to the material has appeared in the welding portions of the members to be welded. This makes it possible to estimate the state of the members to be welded at their welding portions. Accordingly, if the feature point temperature is set to the melting point of the material, stopping the electricity passed between the electrodes in a case where the predetermined feature has appeared in the calculated electrode displacement or the predetermined time has passed after the appearance of the feature makes it possible to stop the passing of electricity after the members to be welded have started melting. This makes it possible to cause the members to be welded to melt and congeal reliably at their welding portions.

In this example, the position of the electrode or the distance from one electrode to the other electrode may be obtained from the rotary position of the motor controlling the welding pressure. Further, the rotary position of the motor may be detected by a preinstalled rotary position sensor, such as an encoder. Further, the electrode displacement may be calculated as the amount of variation in the position of the electrode or the distance from one electrode to the other electrode, e.g., the amount of variation per predetermined time or per unit time. This makes it possible to estimate the state of the members to be welded with the use of an existing component or facility or at least without increasing the number of pieces of components. This also makes it possible to ensure or at least to improve the quality of the welding portions of the members to be welded.

Further, since it becomes possible to appropriately set, as the predetermined feature, the feature in the electrode displacement indicating that the temperature of the members to be welded is at the feature point temperature, it is possible to reliably estimate that the temperature-dependent characteristic corresponding to the members to be welded has appeared when the predetermined feature has appeared. Further, setting this temperature-dependent characteristic to the melting point makes it possible to reliably ensure the quality of the welding portions of the members to be welded.

As described above, the technology allows the quality of a welding portion in resistance welding to be ensured or at least improved. According to one embodiment of the technology, it is possible to obtain the above-described example effects by using an existing facility without an increase in the size of an apparatus or an increase in the cost. The resistance welding according to the technology may be applied not only to welding of similar members to be welded but also to welding of dissimilar members to be welded. Accordingly, the technology contributes to mass production in dissimilar resistance welding of, for example but not limited to, aluminum and steel.

The controller 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the controller 20 illustrated in FIG. 1.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A resistance welding control system comprising:
 a pair of electrodes that oppose each other, at least a first electrode, of the pair of electrodes, being configured to move relative to a second electrode of the pair of electrodes in an approaching-separating direction;
 a motor configured to drive at least the first electrode in the approaching- separating direction; and
 a control device configured to:
  pass electricity between the first and second electrodes while controlling the motor to cause a predetermined welding pressure to be applied by the first and second electrodes to a member to be welded;
  detect a distance from the first electrode to the second electrode in the approaching-separating direction while electricity is being passed between the first and second electrodes;
  determine, while the electricity is being passed between the first and second electrodes, whether a first feature point has appeared in an amount of change in the distance from the first electrode to the second electrode, the first feature point being a point at which the amount of change in the distance switches from increasing to decreasing and corresponding to a local maximum point of a specific heat capacity of the member to be welded;

determine, while the electricity is being passed between the first and second electrodes, whether a second feature point has appeared in an amount of change in the distance from the first electrode to the second electrode, the second feature point being a point at which the amount of change in the distance switches from increasing to decreasing and corresponding to an increase point of a density of the member to be welded;

determine, while the electricity is being passed between the first and second electrodes, whether a third feature point has appeared in an amount of change in the distance from the first electrode to the second electrode, the feature point being a point at which the amount of change in the distance vary from an increase to a decrease and corresponding to a decrease point of the density of the member to be welded;

set a predetermined feature, the predetermined feature being one of the first feature point, the second feature point, and the third feature point; and stop the electricity passed between the first and second electrodes when i) a determination that the predetermined feature has appeared or ii) a predetermined time has elapsed after the determination that the predetermined feature has appeared.

2. A control device for a resistance welding control system, the resistance welding control system including a pair of electrodes opposing each other, at least a first electrode, of the pair of electrodes, being configured to move relative to a second electrode of the pair of electrodes in an approaching-separating direction, the resistance welding control system being configured to pass electricity between the first and second electrodes while causing a predetermined welding pressure to be applied by the first and second electrodes to a member to be welded, the control device comprising circuitry, the circuitry being configured to:
    detect a distance from the first electrode to the second electrode in the approaching-separating direction while the electricity is being passed between the first and second electrodes, determine, while the electricity is being passed between the first and second electrodes, whether a first feature point has appeared in an amount of change in the distance from the first electrode to the second electrode, the first feature point being a point at which the amount of change in the distance switches from increasing to decreasing and corresponding to a local maximum point of a specific heat capacity of the member to be welded;

determine, while the electricity is being passed between the first and second electrodes, whether a second feature point has appeared in an amount of change in the distance from the first electrode to the second electrode, the second feature point being a point at which the amount of change in the distance switches from increasing to decreasing and corresponding to an increase point of a density of the member to be welded;

determine, while the electricity is being passed between the first and second electrodes, whether a third feature point has appeared in an amount of change in the distance from the first electrode to the second electrode, the feature point being a point at which the amount of change in the distance vary from an increase to a decrease and corresponding to a decrease point of the density of the member to be welded;

set a predetermined feature, the predetermined feature being one of the first feature point, the second feature point, and the third feature point; and stop the electricity passed between the first and second electrodes when i) a determination that the predetermined feature has appeared or ii) a predetermined time has elapsed after the determination that the predetermined feature has appeared.

3. A method of controlling a resistance welding control system, the resistance welding control system including a pair of electrodes opposing each other, at least a first electrode, of the pair of electrodes, being configured to move relative to a second electrode of the pair of electrodes in an approaching-separating direction, the resistance welding control system being configured to pass electricity between the first and second electrodes while causing a predetermined welding pressure to be applied by the first and second electrodes to a member to be welded, the method comprising:

detecting a distance from the first electrode to the second electrode in the approaching-separating direction while the electricity is being passed between the first and second electrodes, determining, while the electricity is being passed between the first and second electrodes, whether a first feature point has appeared in an amount of change in the distance from the first electrode to the second electrode, the first feature point being a point at which the amount of change in the distance switches from increasing to decreasing and corresponding to a local maximum point of a specific heat capacity of the member to be welded;

determining, while the electricity is being passed between the first and second electrodes, whether a second feature point has appeared in an amount of change in the distance from the first electrode to the second electrode, the second feature point being a point at which the amount of change in the distance switches from increasing to decreasing and corresponding to an increase point of a density of the member to be welded;

determining, while the electricity is being passed between the first and second electrodes, whether a third feature point has appeared in an amount of change in the distance from the first electrode to the second electrode, the feature point being a point at which the amount of change in the distance vary from an increase to a decrease and corresponding to a decrease point of the density of the member to be welded;

setting a predetermined feature, the predetermined feature being one of the first feature point, the second feature point, and the third feature point; and stopping the electricity passed between the first and second electrodes when i) a determination that the predetermined feature has appeared or ii) a predetermined time has elapsed after the determination that the predetermined feature has appeared.

* * * * *